(12) United States Patent
Kim et al.

(10) Patent No.: US 9,387,610 B2
(45) Date of Patent: Jul. 12, 2016

(54) HARD COATING FORMING METHOD

(75) Inventors: Yun Bong Kim, Daejeon (KR); Won Kook Kim, Daejeon (KR); Yang Go Kang, Daejeon (KR); Jin Woo Kim, Daejeon (KR); Dong Joo Kwon, Daejeon (KR); Mu Seon Ryu, Seoul (KR)

(73) Assignee: LG Hausys, Ltd., Seoul (KR)

( * ) Notice: Subject to any disclaimer, the term of this patent is extended or adjusted under 35 U.S.C. 154(b) by 247 days.

(21) Appl. No.: 13/574,522

(22) PCT Filed: Feb. 9, 2011

(86) PCT No.: PCT/KR2011/000861
§ 371 (c)(1),
(2), (4) Date: Jul. 20, 2012

(87) PCT Pub. No.: WO2011/099766
PCT Pub. Date: Aug. 18, 2011

(65) Prior Publication Data
US 2012/0301629 A1    Nov. 29, 2012

(30) Foreign Application Priority Data
Feb. 10, 2010   (KR) .................. 10-2010-0012431

(51) Int. Cl.
*C08F 2/50* (2006.01)
*B29C 45/14* (2006.01)
*C09D 163/00* (2006.01)
*C08F 222/10* (2006.01)

(52) U.S. Cl.
CPC ........ *B29C 45/14811* (2013.01); *C09D 163/00* (2013.01); *B29K 2995/0087* (2013.01); *C08F 2222/1013* (2013.01); *C08F 2810/20* (2013.01)

(58) Field of Classification Search
CPC ............... B29C 45/14811; B29K 2995/0087; C08F 2/48; C08F 8/34; C08F 2810/20; C08F 220/32; C08F 2220/325; C08F 2222/1006
USPC ........................................ 427/508
See application file for complete search history.

(56) References Cited

U.S. PATENT DOCUMENTS

| 4,439,291 | A  | * | 3/1984 | Irving et al. .................. 522/34 |
| 6,045,738 | A  | * | 4/2000 | Atake ........................ 264/266 |
| 6,153,719 | A  |   | 11/2000 | Abbey et al. |
| 6,232,426 | B1 |   | 5/2001 | Orikabe et al. |
| 6,433,097 | B1 |   | 8/2002 | Nixon et al. |
| 6,457,823 | B1 | * | 10/2002 | Cleary et al. ................ 347/102 |
| 7,122,595 | B1 | * | 10/2006 | Ott et al. .................... 524/502 |

(Continued)

FOREIGN PATENT DOCUMENTS

| CN | 1102504 C       | 3/2003 |
| JP | 1998-067047     | 3/1998 |
| JP | 2002-160262     | 6/2002 |
| WO | WO 9830195 A1 * | 7/1998 |

(Continued)

*Primary Examiner* — Elena T Lightfoot
(74) *Attorney, Agent, or Firm* — Dentons US LLP

(57) ABSTRACT

A hard coating forming method is disclosed that can form a hard coating on surfaces of various manufactured goods including resin products and wood products. The method includes transcribing a coating layer of a sheet having a substrate and the coating layer formed on the substrate, the coating layer containing a thermoset product of a resin composition comprising a resin having an epoxy group and a (meth)acryloyl group and a thiol based curing agent; delaminating the substrate from the sheet; and irradiating light to the coating layer to cure the coating layer.

17 Claims, 6 Drawing Sheets

(56) References Cited

U.S. PATENT DOCUMENTS

| | | |
|---|---|---|
| 7,399,530 B2 | 7/2008 | Hayashida et al. |
| 2007/0237966 A1 | 10/2007 | Takao et al. |
| 2009/0047531 A1 | 2/2009 | Bartley et al. |
| 2009/0291248 A1 | 11/2009 | Hongo et al. |

FOREIGN PATENT DOCUMENTS

| | | |
|---|---|---|
| WO | 2004-039856 | 5/2004 |
| WO | 2005-052021 | 6/2005 |
| WO | WO 2008147037 A1 * | 12/2008 |
| WO | 2011-099766 A2 | 8/2011 |

* cited by examiner

HARD COATING FORMING METHOD

This application is a National Stage Entry of International Application No. PCT/KR2011/000861, filed Feb. 9, 2011, and claims the benefit of Korean Application No. 10-2010-0012431, filed on Feb. 10, 2010, which are hereby incorporated by reference for all purposes as if fully set forth herein.

TECHNICAL FIELD

The present invention relates to a hard coating forming method.

BACKGROUND ART

Various methods are used in order to form a hard coating (also referred to as a protective layer) having superior wear-resistance and chemical resistance on various manufactured goods including resin formed products and wood products. For example, there is a method that uses a sheet (hereinafter, often referred to as "transcribing material") in which a photo curable resin composition is coated on a releasing surface of a releasable substrate. In this method, a coating layer is firstly attached on a surface of a formed product, and then a substrate is delaminated to form a hard coating. There is another method that uses a sheet (hereinafter, often referred to as a "surface protective sheet") in which the coating layer is formed on a substrate not having releasing property and an adhesive layer, etc. is formed on the opposite surface of the substrate as desired. In the latter method, the substrate side of the surface protective sheet is attached on the surface of the formed product to form a hard coating.

A layer showing decorative effect such as a design layer or a deposition layer is formed at proper location of the transcribing material or the surface protective sheet as desired. For the transcribing material, a design layer or a deposition layer is mainly formed between the substrate and the coating layer, and for the surface protective sheet, a design layer or a deposition layer is generally formed on the opposite face, in which the coating layer is formed in the substrate.

When forming a hard coating by using a transcribing material or a surface protective sheet, there is a way (pre-cure way) that the coating layer is photo cured by irradiating light in advance before application to a formed product. In the above pre-cure way, there are problems that when the transcribing material or the surface protective sheet is applied to the formed product, the hard coating is delaminated at curved surface of the formed product, or crack, etc. is happened to the hard coating.

Accordingly, in the step of applying to a formed product, a way (after-cure way), in which a coating layer is maintained in non-cure state, the coating layer is adhered to the surface of the formed product, and then the product is cured, is used, but the following problems occur for the above way.

The transcribing material or the surface protective sheet is generally prepared by using an instrument such as a Gravure rotary printing machine, etc. By the way, for after-cure way, a phenomenon is arisen that the coating layer component in non-cure state is transcribed to a guide roll, etc., or the component used in forming a design layer or an adhesion layer is transcribed on the coating layer, in case the design layer, the deposition layer or the adhesion layer is formed on the upper part of the coating layer for the transcribing material, and the prepared sheet is wound for the surface protective sheet. Further, a phenomenon (so called back trap phenomenon) that the component of the coating layer is back transcribed to the guide roll for forming a design layer or an adhesion layer, also occurs.

Thus, when after-cure way is used, special equipment or drying process is separately used or performed in forming the coating layer in order to remove the fluidity or tackiness of the coating layer before photo cure. However, in such case, the production yield of the transcribing material or the surface protective sheet is lowered, and the production cost is highly increased since the coating layer, the design layer or the adhesion layer cannot be formed with one process, and the design of the separate equipment costs high.

SUMMARY OF THE INVENTION

Problems to be Solved by the Invention

An object of the present invention is to provide a hard coating forming method.

Means for Solving the Problems

The present invention relates to a hard coating forming method comprising:

transcribing or adhering a coating layer of a sheet on a formed product, wherein the sheet has a substrate; and a coating layer that is formed on the substrate and contains a thermoset product of a resin composition comprising a resin having an epoxy group and a (meth)acryloyl group, and a thiol based curing agent; and irradiating light to the coating layer to cure the coating layer.

The term "hard coating" in the present invention refers to a functional layer having high hardness that can be formed on a surface of various formed products including a resin, a wood product, a metal or a composite formed product, etc., thereby providing physical properties such as wear-resistance, scratch-resistance and chemical resistance, etc., and in some cases refers to a functional layer applied to various display apparatuses. The term "hard coating" in the present invention refers to in some cases the same meaning as the protective layer.

Hereinafter, the method of the present invention will be described in detail.

In the present method, a hard coating or a protective layer is formed on a formed product by using a sheet comprising a coating layer which comprises as an effective ingredient a thermoset product of a resin composition comprising a resin having an epoxy group and a (meth)acryloyl group, and a thiol based curing agent. The sheet of the present invention can be a transcribing material or a surface protective sheet.

Further, the coating layer in the above sheet of the present invention can be comprised of photo cure type comprising a thermoset product of the resin composition described above as an effective ingredient. The term "thermoset product of the resin composition" in the present invention refers to the state in which epoxy group contained in the resin and the thiol group of thiol based curing agent are subjected to ring opening addition reaction, etc., thereby forming an addition reactant. Also, the term "photo cure type" refers to the state of the coating layer at which the cure reaction by the reaction of a (meth)acryloyl group, etc. contained in the resin can be progressed upon irradiating an electromagnetic wave. In the above, the electromagnetic wave generally refers to microwave, infra-red (IR), ultraviolet (UV), X ray and γ ray, as well as particle beams such as α-particle beam, proton beam, neutron beam and electron beam.

Figure 1:
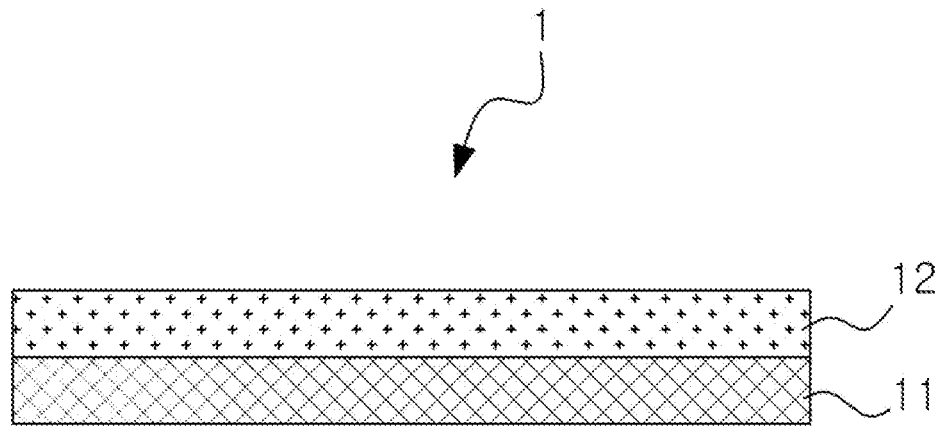
FIGS. 1 to 7 are cross-sectional views of the sheets according to various embodiments of the present invention.

FIG. 1 shows an embodiment of the sheet applied to the method of the present invention. As shown in FIG. 1, the sheet (1) applied to the method of the present invention can comprise a substrate (11) and a coating layer (12) which is formed on one side of the substrate. The sheet (1) of the present invention can further comprise a layer formed on the coating layer (12) or opposite face of the coating layer (12) of the substrate (11).

The expressions "B formed on A," "B formed on upper part of A" or "B formed on the surface of A" comprise shapes that B is directly adhered to the surface of A, or attached with a tackifier or an adhesive, etc. as a mediator, as well as other layer is formed on the surface of A, and B is again formed on the surface of the other layer (e.g., A-C—B).

The type of the substrate that can be used in the sheet of the present invention is not particularly limited. The present invention can use, for example, as a substrate, a resin film comprising, as a main component, polypropylene based resin, a polyethylene based resin, a polyamide based resin, a polyester based resin, a polyacryl based resin, a polyvinyl chloride based resin, an acryl based resin, a polycarbonate based resin, a vinyl chloride based resin, a urethane based resin or a polyester based resin, etc.; a metal foil such as an aluminum foil or a cupper foil, etc., a glassine paper, a coated paper or a cellulose based sheet such as cellophane, etc.; or a composite sheet comprising more than two kinds of the foregoing, and the like. The thickness of the substrate in the present invention is not particularly limited, and can be properly selected depending on a desired use.

In the present invention, in case the sheet consists of a transcribing material, a release layer is formed on the substrate, and the coating layer can be formed on the release layer. In this case, the ways of forming the release layer are not particularly limited, and it can be formed, for example, by using various printing method or coating method using epoxy, epoxy-melamine, aminoalkyd, acryl, melamine, silicon, fluorine, cellulose, urea resin, polyolefin, paraffin or composite releasing agent of more than two of the foregoing.

In the present invention, the substrate or the releasing layer can be constituted in the lightless state, if desired. For example, such lightless state can be formed by performing embossing treatment on the substrate or the releasing layer, or by using the ways that fine powders such as calcium carbonate, silica, zinc oxide, magnesium carbonate, polyethylene wax or glass beads, etc. are included. Thus, in case the sheet is a transcribing material, after delamination of the substrate, minute anti-glare formed on releasing face can be transcribed on the surface of the coating layer, thereby providing the formed product having lightless surface. Such lightless state can be formed totally or partially on the substrate or the releasing layer. In the present invention, the thickness of such releasing layer or lightless layer is not particularly limited, and may be set in proper thickness, if desired.

In the present invention, a resin composition that forms a coating layer which is formed on the sheet comprises a resin having an epoxy group and a (meth)acryloyl group as described previously. The terms "(meth)acryloyl group," "(meth)acrylate" or "(meth)acrylic acid" commonly refer to an acryloyl group or methacryloyl group; acrylate or methacrylate; or an acrylic acid or a methacrylic acid.

The resin contained in the resin composition of the present invention can have epoxy equivalent weights of 200 g/eq to 20,000 g/eq, preferably 2,000 g/eq to 8,000 g/eq, and more preferably 4,000 g/eq to 8,000 g/eq. The term "epoxy equivalent weight, g/eq" refers to the value of the molecular weights of the epoxy group divided by the number of the epoxy group. Such epoxy equivalent weight can be analyzed by various chemical titration methods known to the art. The present invention can provide a resin layer having superior properties in terms of solvent resistance or chemical resistance, etc., in which process efficiency such as thermoset efficiency is superior, and tackiness or adhesiveness is properly controlled after thermoset curing, by controlling the epoxy equivalent weight in the range described above.

In the resin composition of the present invention, the resin can also have (meth)acryloyl equivalent weights of about 100 g/eq to 1,000 g/eq, preferably 200 g/eq to 500 g/eq. The term "(meth)acryloyl equivalent weight, g/eq" refers to the value of the molecular weights of the (meth)acryloyl group divided by the number of the (meth)acryloyl group contained in the resin. Such (meth)acryloyl epoxy equivalent weight can be analyzed by various chemical titration methods known to the art. The present invention can provide a hard coating, in which process efficiency such as thermoset efficiency is superior, and properties such as wear-resistance, scratch-resistance and chemical resistance, etc. are superior after curing, by controlling (meth)acryloyl equivalent weight of the resin in the range described above.

In the present invention, the resin comprising an epoxy group and a (meth)acryloyl group can have weight average molecular weights of about 5,000 to 100,000, preferably about 10,000 to 80,000, and more preferably about 20,000 to 70,000. The term "weight average molecular weight, Mw" refers to polystyrene conversion value measured by GPC (Gel permeation chromatography). The present invention can provide a hard coating in which process efficiency such as coating ability, thermoset property and photo curing property, etc. is superior and tackiness or adhesiveness is properly controlled after thermoset curing, and superior properties in terms of wear-resistance, scratch-resistance and chemical resistance, etc., are imparted after photo curing by controlling the weight average molecular weight in the range described above.

In the present invention, a method of manufacturing the resin described above is not particularly limited. In the present invention, for example, a resin described above can be manufactured by polymerizing a monomer mixture comprising a monomer (e.g., glycidyl(meth)acrylate) having an epoxy group to form a polymer having an epoxy group, and performing addition reaction of the polymer with a compound having a (meth)acryloyl group, e.g., α,β-unsaturated monocarbonic acid (e.g., (meth)acrylic acid).

In an embodiment of the present invention, the monomer mixture can comprise glycidyl(meth)acrylate alone, or optionally comprise glycidyl(meth)acrylate and other comonomer.

The types of comonomers which can be included in the monomer mixture in the above are not particularly limited, if they include α,β-unsaturated carbon carbon double bonds in the molecular structure. In the present invention, for example, an alkyl(meth)acrylate having an alkyl group having 1 to 14 carbon atoms, styrene, vinyl acetate or (meth)acrylonitrile, etc. can be used, but the comonomers are not limited to thereto. In the present invention, if the monomer mixture comprises glycidyl(meth)acrylate and comonomer, the proportion of each monomer is not particularly limited, and can be properly controlled in view of desired effect. For example, the monomer mixture can comprise 5 to 70 parts by weight of glycidyl(meth)acrylate and 5 to 70 parts by weight of comonomers.

In the present invention, a method of manufacturing a polymer by polymerization of the monomer mixture described above is not particularly limited, and for example, a polymerizing method generally known to the art such as solution polymerization, photo polymerization, bulk polymerization, suspension polymerization or emulsion polymerization can be applied without limitation.

In the present invention, the resin described previously can be prepared by subjecting to addition reaction of the polymer formed as described above and a compound having a (meth) acryloyl group, for example, α,β-unsaturated monocarbonic acid (e.g., (meth)acrylic acid, etc.). In this case, the method and condition of addition reaction of the polymer and the compound are not particularly limited, and general ways known to the art can be properly selected. Further, in the present invention, the amount of the (meth)acryloyl group containing compound compared to the polymer, applied to the addition reaction, is also not particularly limited, and can be properly selected within a range that can satisfy the epoxy equivalent described previously and the (meth)acryloyl equivalent. In the present invention, the compound can be used so that the remaining amount of the epoxy group contained in the polymer during the addition reaction may be below about 50%, preferably below about 30%, and more preferably below about 5% based on the amount of the monomer having the epoxy group participated in the reaction when the reaction equivalent of α,β-unsaturated monocarbonic acid is 100%.

The resin composition of the present invention comprises a thiol based curing agent. The term "thiol based curing agent" in the present invention refers to a compound comprising at least one thiol group capable of thermosetting a resin composition primarily in the molecule by reacting with an epoxy group or a carbon-carbon double bond of the compound contained in the composition.

The type of the thiol based curing agent that can be used in the present invention is not particularly limited, if it has more than one, preferably more than two thiol groups in the molecular structure.

The present invention can use, for example, at least one polythiol selected from the group consisting of ethoxylated trimethylolpropane tris(3-mercaptopropionate), trimethylolpropane tris(3-mercaptopropionate), glycol di(3-mercaptopropionate), pentaerythritol tetrakis(3-mercaptopropionate), 4-mercaptomethyl-3,6-dithia-1,8-octanedithiol, pentaerythritol tetrakis(3-mercaptoacetate), trimethylolpropane tris(3-mercaptoacetate), 4-t-butyl-1,2-benzenedithiol, 2-mercaptoethylsulfide, 4,4'-thiodibenzenethiol, benzenedithiol, glycol dimercaptoacetate, glycol dimercaptopropionate ethylene bis (3-mercaptopropionate), polyethylene glycol dimercaptoacetate and polyethylene glycol di(3-mercaptopropionate), as the thiol based curing agent.

In the present invention, a compound represented by the formula I below can be preferably used as the thiol based curing agent.

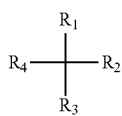

[Formula I]

In the formula I, $R_1$ to $R_4$ represent each independently hydrogen, an alkyl, an alkoxy, an alkenyl, an alkinyl or a thiol-containing group, and more than two of the $R_1$ to $R_4$ represent thiol-containing groups.

The terms "alkyl" or "alkoxy" in the specification refer to straight chain or branched chain; or cyclic or acyclic alkyl or alkoxy having carbon atoms of 1 to 20, 1 to 16, 1 to 12, 1 to 8 or 1 to 4, and such alkyl or alkoxy can be optionally substituted by at least one substituents.

Also, the terms "alkenyl" or "alkinyl" in the specification refer to straight chain or branched chain; or cyclic or acyclic alkenyl or alkinyl having carbon atoms of 2 to 20, 2 to 16, 2 to 12, 2 to 8 or 2 to 4, and such alkenyl or alkinyl can be optionally substituted by at least one substituents.

In the definition of the terms described above, an example of the substituent that can be substituted by an alkyl, an alkoxy, an alkenyl or an alkinyl, etc. includes all substituents generally applied in the chemistry art, and particularly includes a thiol, an amine, an amide, a halogen, a hydroxy, a carboxy, a glycidyl, a cyano, a nitro, a hetercycloalkyl or an aryl, etc., but is not limited to thereto.

Also, the types of the thiol containing groups in the compound of the formula I are not particularly limited, if they are mono-valent residues having a thiol group (—SH) at the end of the substituent structure. In an embodiment of the present invention, the thiol containing group can be, for example, mono-valent residue represented by the formula II below.

  [Formula II]

In the formula II, A is a single bond or an alkylene, B is —NH(C=O)—, —OC(=O)—, —O-E-OC(=O)—, —SC (=O)— or —OCH$_2$—, C is a single bond or an alkylene, D is a single bond or a divalent residue represented by the formula III below, and E represents an alkylene.

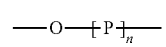

[Formula III]

In the formula III, P represents divalent aryl, and n represents an integer of 0 to 10.

The term "single bond" in the A, C or D means that separate atom is not present at A, C or D places. For example, if A is a single bond, the thiol containing group can be represented by —B—C-D-SH, if C is a single bond, the thiol containing group can be represented by -A-B-D-SH, and if D is a single bond, the thiol containing group can be represented by -A-B—C—SH.

Also, the term "alkylene" in the specification refers to straight chain or branched chain; or cyclic or acyclic alkylene having carbon atoms of 1 to 20, 1 to 16, 1 to 12, 1 to 8 or 1 to 4, and such alkylene can be optionally substituted by at least one substituents.

Also, the term "divalent aryl" refers to bivalent moiety derived from an aromatic ring compound, or containing the compound within the skeleton, and in particular, bivalent moiety derived from 6 to 22-membered, 6 to 18-membered, 6 to 14-membered or 6 to 10-membered an aromatic ring compound, or containing the compound within the skeleton, and such aryl can be optionally substituted by at least one substituents.

Also, in the formula III, n represents preferably 0 to 7, more preferably 0 to 5, still more preferably 0 to 3, or even more preferably 1 to 3.

An example of the substituent that can be substituted in an alkylene or a divalent aryl is the same as described in the section of the formula I.

In the thiol based curing agent of the formula I according to the present invention, $R_1$ to $R_4$ can be, preferably, each independently hydrogen, an alkyl having carbon atoms of 1 to 4 or -A-B—C-D-SH, and, more preferably, each independently hydrogen, methyl, ethyl or -A-B—C-D-SH.

Also, in the definition of the preferable thiol based curing agent, more than two, preferably more than three of $R_1$ to $R_4$ can be -A-B—C-D-SH, wherein A can be preferably a single bond or an alkylene having carbon atoms of 1 to 4, B can be —OC(=O)— or —O-E-OC(=O)—, C can be a single bond or an alkylene having carbon atoms of 1 to 4, D can be a single bond or a divalent residue represented by the formula IV below, and E can be an alkylene having carbon atoms of 1 to 4.

[Formula IV]

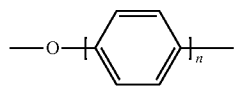

In the formula IV, n represents an integer of 0 to 10, preferably 0 to 7, more preferably 0 to 5, still more preferably 0 to 3, and even more preferably 1 to 3.

An example of the thiol based curing agent represented by the formula described above includes alkoxylated trimethylolpropane tris(3-mercaptopropionate), trimethylolpropane tris(3-mercaptopropionate) or alkyleneglycol bis(3-mercaptopropionate), etc. and more particularly ethoxylated trimethylolpropane tris(3-mercaptopropionate), trimethylolpropane tris(3-mercaptopropionate) or ethyleneglycol di(3-mercaptopropionate), etc., but is not limited thereto.

In the resin composition of the present invention, the amount of the thiol based curing agent can be properly selected in view of the equivalent weight of the epoxy group contained in the resin, or desired curing degree, and is not particularly limited. For example, the resin composition of the present invention can comprise 0.1 to 10 parts by weight, preferably 0.5 to 5 parts by weight of the thiol based curing agent per 100 parts by weight of the resin described previously. In the present invention, the reaction of the thiol based curing agent with the epoxy group of the resin during thermal curing is properly elicited, the expression of tackiness is properly controlled after thermal curing, and the properties such as solvent resistance or coatability can be excellently maintained, by controlling the amount of the thiol based curing agent compared to the resin as described above.

The resin composition that forms coating layer in the present invention can further comprise a photo initiator. The type of the photo initiator that can be used in the present invention is not particularly limited, and the general type of the photo initiator known to the art can be used without limitation.

In the present invention, for example, a compound such as benzoin based, hydroxyketone based, aminoketone based or phosphine oxide based compound can be used, and more particularly, benzoin, benzoin methylether, benzoin ethylether, benzoin isopropylether, benzoin n-butylether, benzoin isobutylether, acetophenone, dimethylamino acetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexylphenylketone, 2-methyl-1-[4-(methylthio)phenyl]-2-morpholino-propane-1-one, 4-(2-hydroxyethoxy)phenyl-2-(hydroxy-2-propyl)ketone, benzophenone, p-phenylbenzophenone, 4,4'-diethylaminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyldimethylketal, acetophenone dimethylketal, p-dimethylamino benzoic acid ester, oligo[2-hydroxy-2-methyl-1-[4-(1-methylvinyl)phenyl]propanone and 2,4,6-trimethylbenzoyl-diphenyl-phospine oxide, etc. can be used. In the present invention, at least one or more than two types of the compound can be used, but the compound is not limited thereto.

In the resin composition of the present invention, photo initiator can be comprised in 1 to 15 parts by weight, preferably 3 to 12 parts by weight, and more preferably 5 to 10 parts by weight per 100 parts by weight of the above resin. Photo curing efficiency can be excellently maintained, and decline in physical properties due to a component remaining after curing can be prevented by controlling the amount of the photo initiator within the above range.

The resin composition of the present invention can further comprise multifunctional acrylates. Since the resin composition of the present invention comprises multifunctional acrylates, the hard coating realizes dense crosslinking structure after photo curing, and thus the properties of the hard coating such as hardness, wear-resistance, scratch-resistance and chemical resistance, etc. can be more improved.

The types of the multifunctional acrylate that can be used in the present invention are not particularly limited, and, for example, difunctional acrylates such as 1,4-butanediol di(meth)acrylate, 1,6-hexanediol di(meth)acrylate, neophentylglycol di(meth)acrylate, polyethyleneglycol di(meth)acrylate, neopentylglycol adipate) di(meth)acrylate, hydroxyl pivalic acid neophentylglycol di(meth)acrylate, dicyclopentanyl di(meth)acrylate, caprolactone denatured dicyclopentenyl di(meth)acrylate, ethyleneoxide denatured di(meth)acrylate, di(meth)acryloxy ethyl isocyanurate, allylated cyclohexyl di(meth)acrylate, tricyclodecane dimethanol(meth)acrylate, dimethylol dicyclopentane di(meth)acrylate, ethyleneoxide denatured hexahydrophthalic acid di(meth)acrylate, tricyclodecane dimethanol (meth)acrylate, neopentylglycol denatured trimethylpropane di(meth)acrylate, adamantane di(meth)acrylate or 9,9-bis[4-(2-acryloyloxyethoxy)phenyl](fluorine), etc.; trifunctional acrylates such as trimethylolpropane tri(meth)acrylate, dipentaerythritol tri(meth)acrylate, propionic acid denatured dipentaerythritol tri(meth)acrylate, pentaerythritol tri(meth)acrylate, propyleneoxide denatured trimethylolpropane tri(meth)acrylate, trifunctional urethane(meth)acrylate or tris(meth)acryloxyethyl isocyanurate, etc.; tetrafunctional acrylates such as diglycerine tetra(meth)acrylate or pentaerythritol tetra(meth)acrylate, etc.; pentafunctional acrylates such as propionic acid denatured dipentaerythritol penta(meth)acrylate, etc.; and hexafunctional acrylates such as dipentaerythritol hexa (meth)acrylate, caprolactone denatured dipentaerythritol hexa(meth)acrylate or urethane(meth)acrylate (e.g., a reaction product of an isocyanate monomer and trimethylolpropane tri(meth)acrylate), etc. can be used, but those are not limited thereto.

In the present invention, in particular, an acrylate comprising cyclic structure and/or urethane structure in the molecular structure is preferable as multifunctional acrylate. A hard coating having high index of refraction while having superior hardness after curing can be provided by using such acrylates. In this case, the cyclic structure contained in the acrylates may be any of carbon cyclic structure or heterocyclic structure; or monocyclic or polycyclic structure. In particular, the example of the cyclic structure contained in the multifunctional acrylates includes a cycloalkyl cyclic structure having carbon atoms of 3 to 12, preferably 3 to 8, such as cyclopentane, cyclohexane or cycloheptane, etc., and at least one, preferably 1 to 5, more preferably 1 to 3 of the cyclic structure can be included in the acrylates, and the cyclic structure can include at least one hetero atoms such as O, S or N.

The specific examples of such multifunctional acrylates having cyclic structures that can be used in the present invention include a monomer having isocyanurate structure such as tris(meth)acryloxy ethyl isocyanurate, or isocyanurate denatured urethane acrylate (e.g., a reaction product of an isocyanate compound (e.g., isoborone diisocyanate) having cyclic structure in the molecule and an acrylate compound (e.g., trimethylolpropane tri(meth)acrylate or pentaerythritol tri (meth)acrylate), etc., but those are not limited thereto.

In the resin composition of the present invention, the multifunctional acrylate can be contained in the amount of less than 30 parts by weight, preferably 5 to 15 parts by weight per 100 parts by weight of the resin described above. In the present invention, the hard coating can provide a coating layer having more superior properties such as superior hardness by controlling the amount of the multifunctional acrylate in the range described above.

The resin composition of the present invention can further comprise an antioxidant which can control yellowing that can be arisen in the coating layer.

The types of the antioxidant that can be used in the present invention are not particularly limited, and a general antioxidant well known to the art can be used. In the present invention, for example, a phenol based antioxidant (e.g., IRGANOX; RONOTEC; ETANOX), a phosphorus based antioxidant (e.g., CYANOX; ULTRANOX) or a chelate based antioxidant, etc. can be used.

The amount of the antioxidant in the present invention is not particularly limited and can be properly selected in view of the properties of the coating layer. The resin composition of the present invention can comprise, for example, the antioxidant in the amount of 0.1 to 2 parts by weight per 100 parts by weight of the resin described above.

The resin composition of the present invention can further comprise a lubricant. The lubricant can improve the winding efficiency of the coating layer formed from the resin composition, blocking-resistance, wear-resistance and scratch-resistance. The types of the lubricant that can be used in the present invention are not particularly limited, and for example, waxes such as polyethylene wax, paraffin wax, synthetic wax or montan wax; and synthetic resins such as a silicon based resin or a fluorine based resin can be used. The amount of the lubricant in the resin composition of the present invention is not particularly limited, and can be comprised, for example, in 0.5 to 15 parts by weight, preferably 1 to 6 parts by weight per 100 parts by weight of the resin described above. By controlling the amount of the lubricant in the range described above, superior blocking-resistance, wear-resistance and scratch-resistance can be provided to the coating layer, and its transparency can be also maintained excellently.

The resin composition of the present invention can comprise a proper amount of a UV absorber for the purpose of enhancing light-resistance. The UV absorber that can be used in the present invention includes hydroxyphenyl benzotriazole, hydroxyphenyl-S-triazine or 2-(2'-hydroxy-5'-methacryloxyethylphenyl)-2H-benzotriazole, etc., but is not limited to thereto. If the UV absorber is comprised in the present invention, its amount is not particularly limited, and can be properly selected in view of desired properties.

The resin composition of the present invention can further comprise general ingredients well known to the art, for example, a thermosetting catalyst such as DMAP (dimethylaminopyridine), a filler ingredient such as nano silica, or an isocyanate compound, etc. within a range not affecting the object of the invention in addition to above ingredients.

In the present invention, a method of forming a coating layer on a substrate using the above resin composition is not particularly limited. In the present invention, for example, the epoxy group or the carbon-carbon double bond of the resin in the composition is reacted with a thiol based curing agent to form an addition reactant, and the composition comprising the addition reactant is properly coated on the substrate to form the coating layer, by treating the above resin composition at a proper condition. In this case, the condition of forming the addition reactant is not particularly limited, and a proper reaction condition can be set in view of the amount of the epoxy group or the thiol group contained in the resin or the curing agent. In the present invention, for example, the resin composition is combined, and treated at a condition of about 100° C. to 170° C. for 30 seconds to 2 minutes to form the addition reactant.

In the present invention, a coating layer having no tackiness can be formed even without performing a separate drying process, etc., by forming a coating layer in the form described above. Thus, in the present invention, it is possible to further form other layers such as a design layer, a deposition layer or a adhesion layer on the coating layer, or to wind sheets, even without using a special equipment for forming the coating layer, or performing a separate drying process, etc.

The thickness of such coating layer in the sheet of the present invention is not particularly limited, and can be properly set in view of desired properties.

Figure 2:
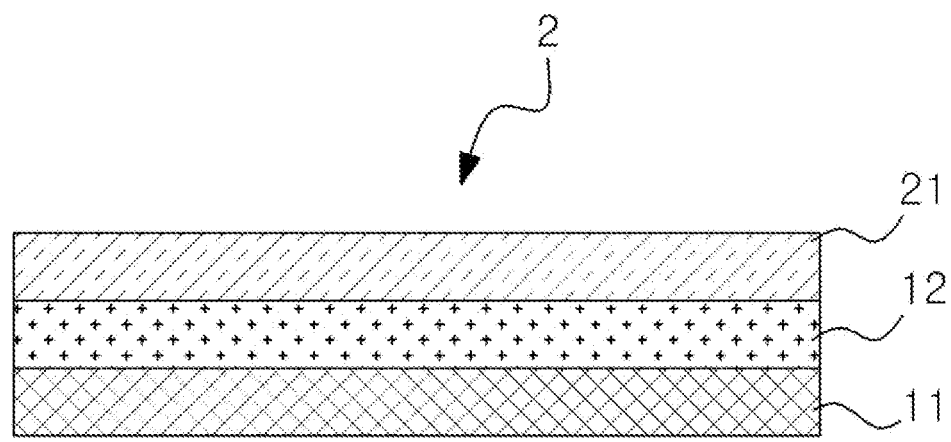
Figure 3:
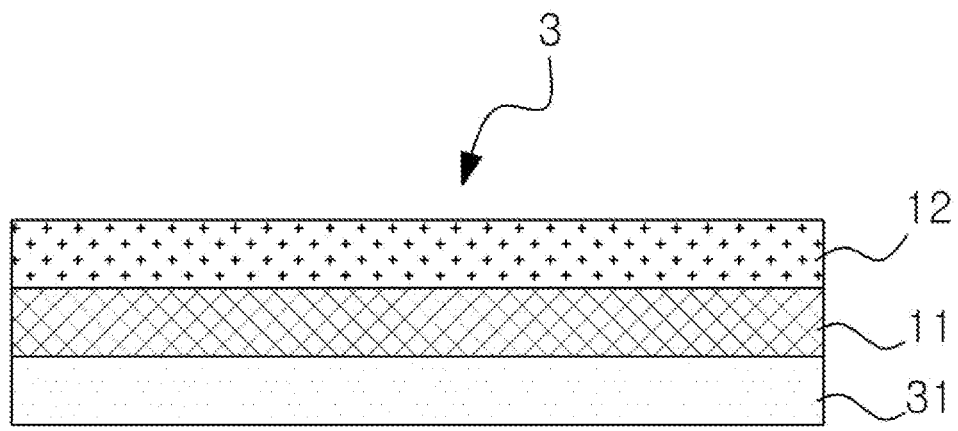

As shown in FIG. 2 or 3, the sheet (2, 3) of the present invention can further comprise an adhesion layer (21, 31) formed on the upper part of the coating layer (12) or the substrate (11). Such adhesion layer (21, 31) can be used as a use of providing adhesive force for a formed product, if the sheet (2) of the present invention is used as the transcribing material or the surface protective sheet.

In the present invention, the adhesion layer (21, 31) can be formed by using various heat-sensitive or pressure-sensitive resins known to the art. In the present invention, the adhesion layer can be formed by using a proper component selected from, for example, a polyacryl based resin, a polystyrene based resin, a polyamide based resin, a chlorinated polyolefin based resin, a chlorinated ethylene-vinyl acetate copolymer resin or a rubber based resin in view of the material of the adherents on which the adhesion layer (21, 31) is adhered.

Figure 4:
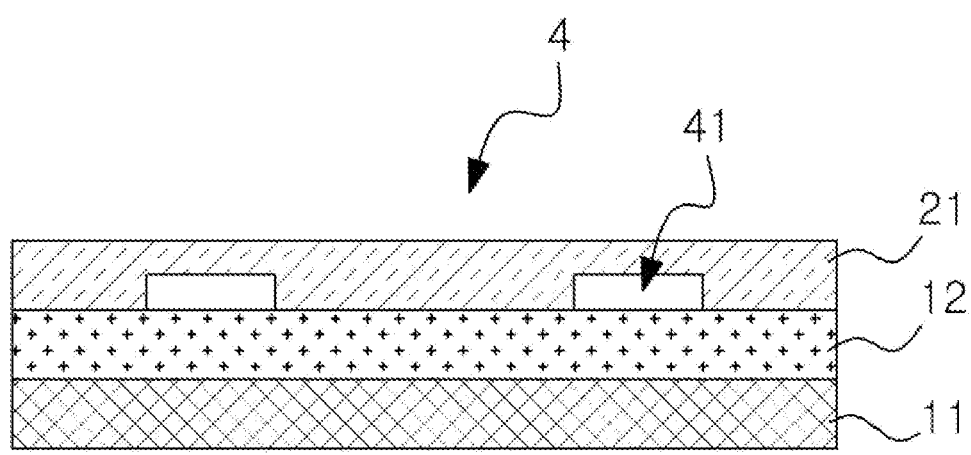
Figure 5:
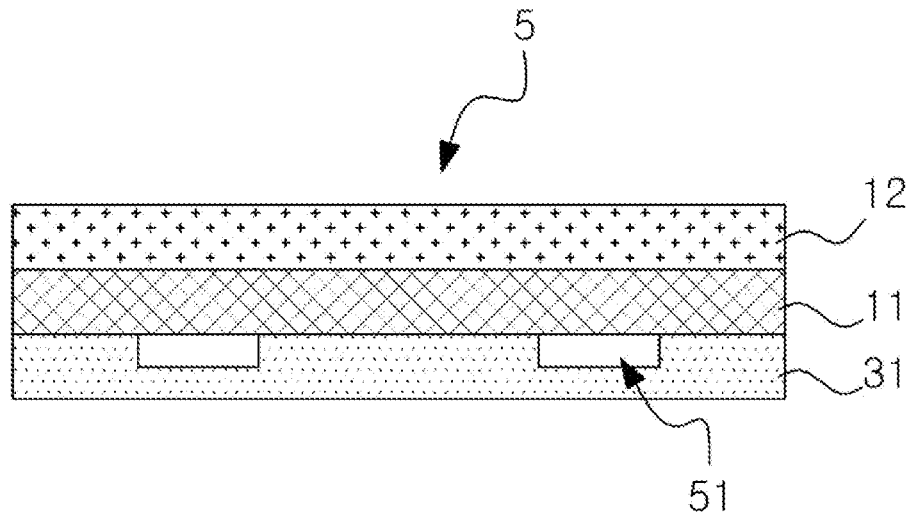

In the present invention, as shown in FIG. 4 or 5, the sheet (4, 5) can comprise a design layer (41, 51) formed on the coating layer (12) or a substrate (11), and an adhesion layer (21, 31) formed on the design layer (41, 51). In the present invention, the method of forming such design layer (41, 51) is not particularly limited. In the present invention, the design layer can be formed by using resins such as a polyvinyl based resin, a polyamide based resin, a polyester based resin, a polyacryl based resin, a polyurethane based resin, a polyvinylacetal based resin, a polyester urethane based resin, a cellulose ester based resin or an alkyd resin as a binder, and colored inks comprising a pigment or a dye having proper colors. In the present invention, the method of forming, and the thickness of such design layer are not particularly limited, and means known to the art can be properly applied.

Figure 6:
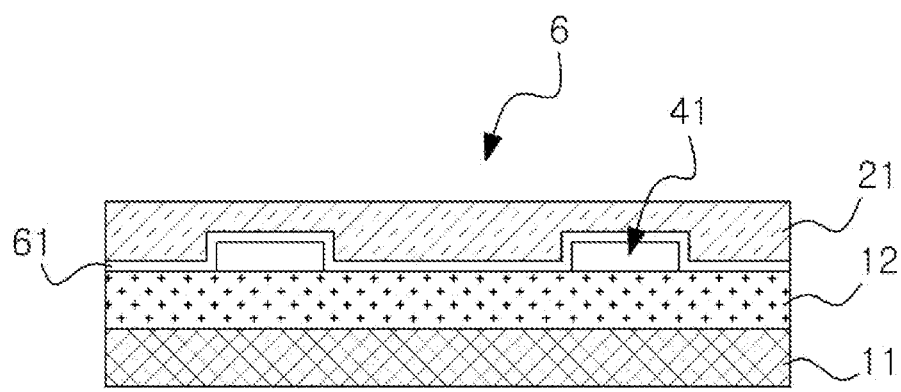
Figure 7:
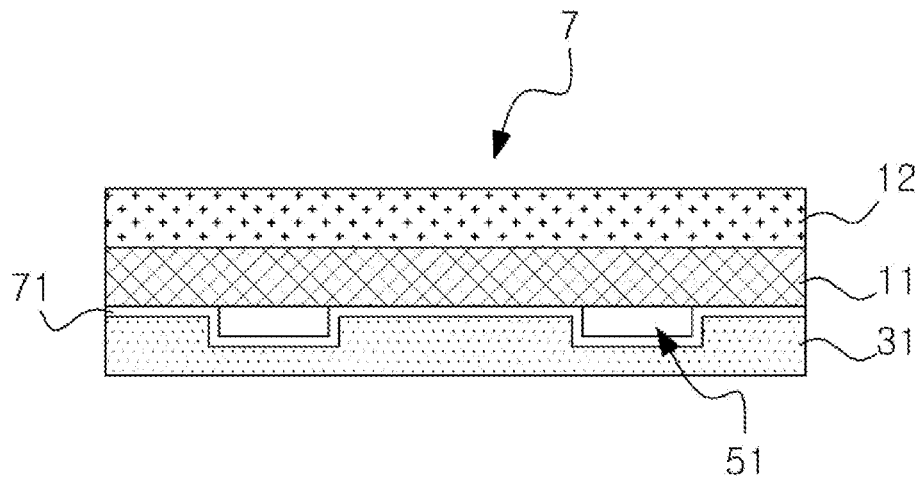

In the present invention, as shown in FIG. 6 or 7, the sheet (6, 7) can further comprise a deposition layer (61, 71) formed on the design layer (41, 51). FIG. 6 or 7 shows that the design layer (41, 51) is formed on the coating layer (12) or the substrate (11), and the deposition layer (61, 71) is formed on the upper part of the design layer. However, in the present invention, the deposition layer (61, 71) can be formed directly on the coating layer (12) or the substrate (11) without the design layer (41, 51) if desired. The material for forming the deposition layer and the method of forming it are not particularly limited, and the deposition layer can be formed through general methods using material generally used in the art, for example, vacuum deposition or sputtering method, etc.

In the sheet of the present invention, more than one anchor layer can be included at proper location between each layers described above. Such an anchor layer can play roles in elevating adhesion between each layers of the sheet, and protecting the formed product or design layer from chemicals, etc. Such an anchor layer can be formed with general means by employing a general two liquid type urethane resin, a thermosetting resin such as a melamine based resin or an epoxy based resin, or a thermoplastic resin such as a vinyl-chloride copolymer resin, etc.

In the method of the present invention, the coating layer of the sheet is transcribed or adhered to a formed product using the sheet described above, and the coating layer is photo cured to form a hard coating.

The term "transcribing of a coating layer" in the present invention refers to a way that is mainly applied in case the sheet of the present invention consists of a transcribing material (e.g., the sheet of FIGS. 2, 4 and 6); and a coating layer of the sheet or an adhesion layer (if the latter is formed on the former) is adhered on the surface of the formed product, and the substrate is delaminated, thereby forming the coating layer. Also, the term "adhesion of a coating layer" in the present invention refers to a way that is mainly applied in case the sheet of the present invention consists of a surface protective sheet (e.g., the sheet of FIGS. 3, 5 and 7); and a substrate of the sheet or an adhesion layer (if the latter is formed on the substrate) is adhered on the surface of the formed product, thereby forming the coating layer.

That is, the method of the present invention can comprise various steps according to the shape of the sheet to be used.

For example, the above method can comprise adhering the coating layer (or the adhesion layer formed on the coating layer) of the sheet on a surface of a formed product; delaminating the substrate; and curing the coating layer by irradiating light, if the sheet of the present invention consists of a transcribing material.

Further, the above method can comprise injection molding to prepare a formed product, and simultaneously forming a hard coating thereon, if the sheet used in the present invention consists of a transcribing material. In this case, the above method can comprise locating the sheet into an injection mold so that the coating layer of the sheet (or an adhesion layer, if it is formed on the coating layer) can be contacted with the formed product; injecting a melted resin into a cavity within the injection mold; delaminating the substrate from the sheet; and curing the coating layer by irradiating light.

The method of the present invention can comprise locating the sheet so that the substrate side (or the adhesion layer, if it is formed on the substrate) faces the surface of the formed product; heating the sheet to soften the substrate; subjecting the sheet to vacuum suction from the lower part to adhere to the surface of the formed product; and curing the coating layer by irradiating light, if the sheet consists of a surface protective sheet.

Further, the above method can comprise injection molding to prepare a formed product, and simultaneously forming a hard coating thereon, even if the sheet is the surface protective sheet. In this case, the above method can comprise locating the sheet into an injection mold so that the substrate of the sheet (or the adhesion layer, if it is formed on the substrate) can be contacted with the formed product; injecting a melted resin into a cavity within the injection mold; and curing the coating layer by irradiating light.

In each methods of the present invention described above, the order of each steps is not particularly limited, and the order of some steps can be changed or those steps can be performed simultaneously, as desired. In the method of the present invention, for example, in case the steps of delamination of the substrate and irradiation of light are performed, the substrate can be first delaminated, and then irradiated with light for photo curing; or the coating layer can be first cured using a substrate having light transmittance as the substrate, and then the substrate can be delaminated. Also, in the methods of the present invention, the processes of heating, softening and vacuum suction, etc. can be performed simultaneously.

Hereinafter, the transcribing method of the present invention will be explained in particular with reference to the attached drawings.

Figure 8:
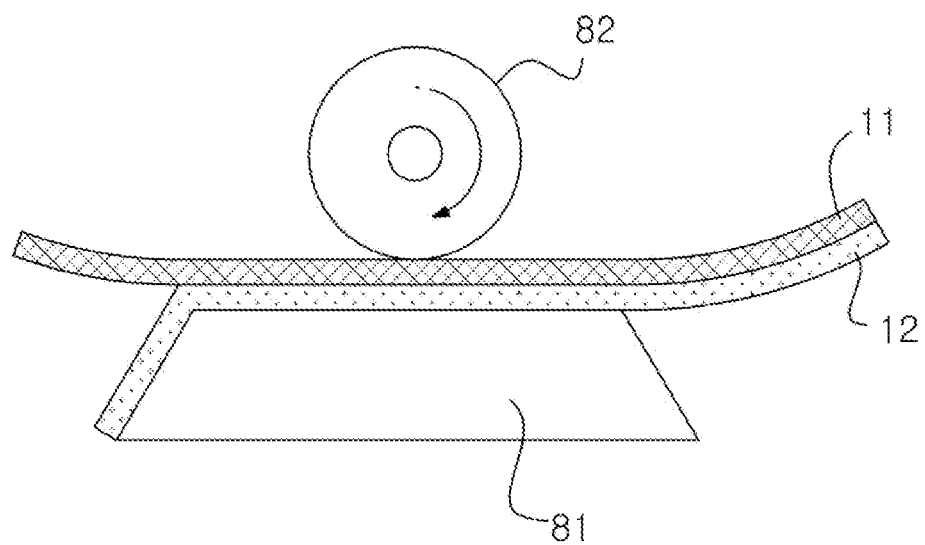
FIGS. 8 to 11 show schematically a hard coating forming method according to various embodiments of the present invention.

FIG. 8 shows schematically a hard coating forming method according to an embodiment of the present invention.

In the above method of the present invention, firstly, the coating layer (12) side (an adhesion layer side, which is not shown in the drawing, but if the adhesion layer is formed on the coating layer (12)) of the sheet is located below on the formed product (81). Then, heat and/or pressure are applied to the substrate (11) side of the sheet through a heat-resistant rubberlike elastic body (82) as a mediator, under the condition of a temperature of about 80° C. to 260° C. and a pressure of about 50 kg/m$^2$ to 200 kg/m$^2$ by employing a transcriber such as a roll transcriber or an up-down transcriber equipped with the heat-resistant rubberlike elastic body (82), for example, silicon rubber, etc. The coating layer (12) or the adhesion layer, etc. is adhered on the surface of the formed product (51) in such a way. Then, after properly subjecting to cooling process as desired, if the substrate (11) is delaminated, the delamination occurs at the interface between the substrate (11) and the coating layer (12). Thereafter, the coating layer (12) transcribed to the formed product (81) is subjected to photo curing by irradiation of light. As described previously, the photo curing process can be also performed before the delamination of the substrate (11).

In the present invention, the condition of performing irradiation of light is not particularly limited, and may be selected within a proper range in view of the constitution of the coating layer. In the present invention, the irradiation of light can be performed in the ways of irradiating UV using means such as a high pressure mercury lamp, an electrodeless lamp or a xenon lamp, etc. In this case, the irradiation of light can be performed under the condition of illuminance of 80 mW/cm$^2$ to 200 mW/cm$^2$ and irradiance of 1,000 mJ/cm$^2$ to 2,000 mJ/cm$^2$ for 1 second to 5 minutes by using UV having a wavelength of about 300 nm to 400 nm.

Further, in the present invention, the material of the formed product is not particularly limited. In the present invention, for example, the formed product can be a resin formed product, a wood product, a metal product, a composite product of more than two of the foregoing, or any other formed products in which a hard coating is required. The resin of the resin formed product includes a general resin such as a polystyrene based resin, a polyolefin based resin, an ABS resin, an AS resin or an AN resin. Further, a general engineering resin such as a polyphenylene oxide polystyrene based resin, a polycarbonate based resin, a polyacetal based resin, an acryl based resin, a polycarbonate denatured polyphenylene ether resin, a polyethylene terephthalate resin, a polybutylene terephthalate resin or an ultra-high molecular weight polyethylene resin; or a super engineering resin such as a polysulfone resin, a polyphenylene sulfide based resin, a polyphenylene oxide based resin, a polyacrylate based resin, a polyetherimide resin, a polyimide resin, a liquid crystal polyester resin or a polyaryl based heat-resistant resin can be also used. In addition, in the present invention, a composite resin in which a reinforcing material such as a glass fiber or an inorganic filler is added can be used.

Figure 9:
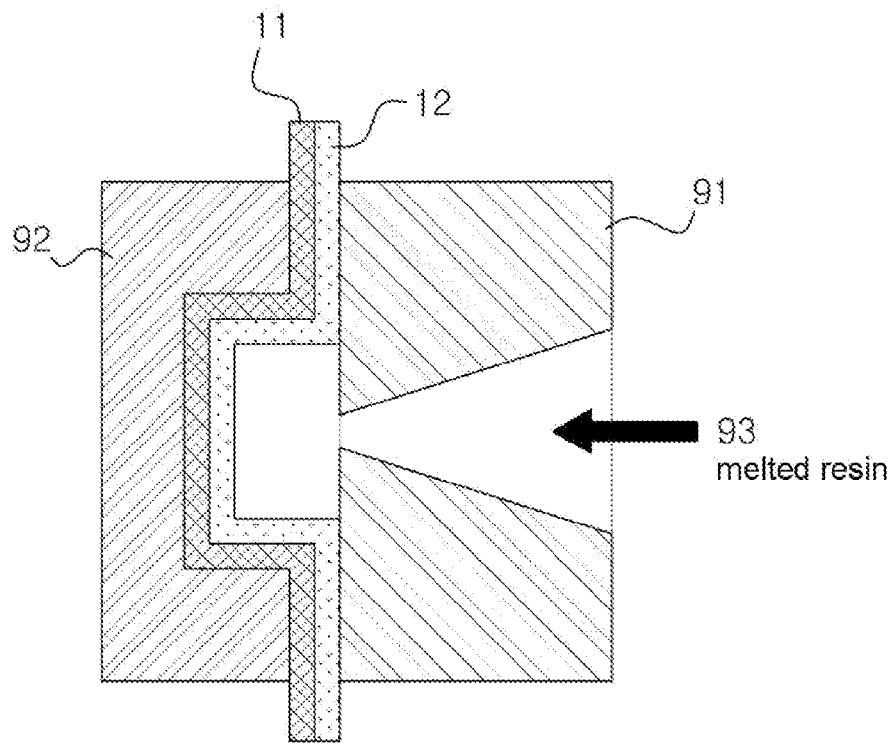

FIG. 9 shows schematically a hard coating forming method according to another embodiment of the present invention, and shows a method of transcribing a coating layer on a surface of a formed product by using concurrent molding-transcribing method by injection molding.

In the above method, the sheet is located into an injection mold comprising a movable mold (91) and a fixed mold (92) so that the coating layer (12) side (or the adhesion layer side, which is not shown in the drawing, but if the adhesion layer is formed on the coating layer) is inner side, and the substrate (11) faces the fixed mold (92). Subsequently, the mold is closed, and then the melted resin is injected into the mold from the gate formed in the movable mold (91), thereby forming a formed product, and at the same time the coating layer is adhered on the surface of the formed product. Then, the resin formed product is cooled at proper condition as desired, and then the forming mold is opened and the resin formed product is removed. And the coating layer is cured before or after delamination of the substrate (11) by irradiation of light, thereby forming a hard coating.

The type of the resin and the condition of irradiation of light used in forming the formed product in the above method are not particularly limited, and can be properly selected, for example, within a range shown in the method of FIG. 8.

Figure 10:
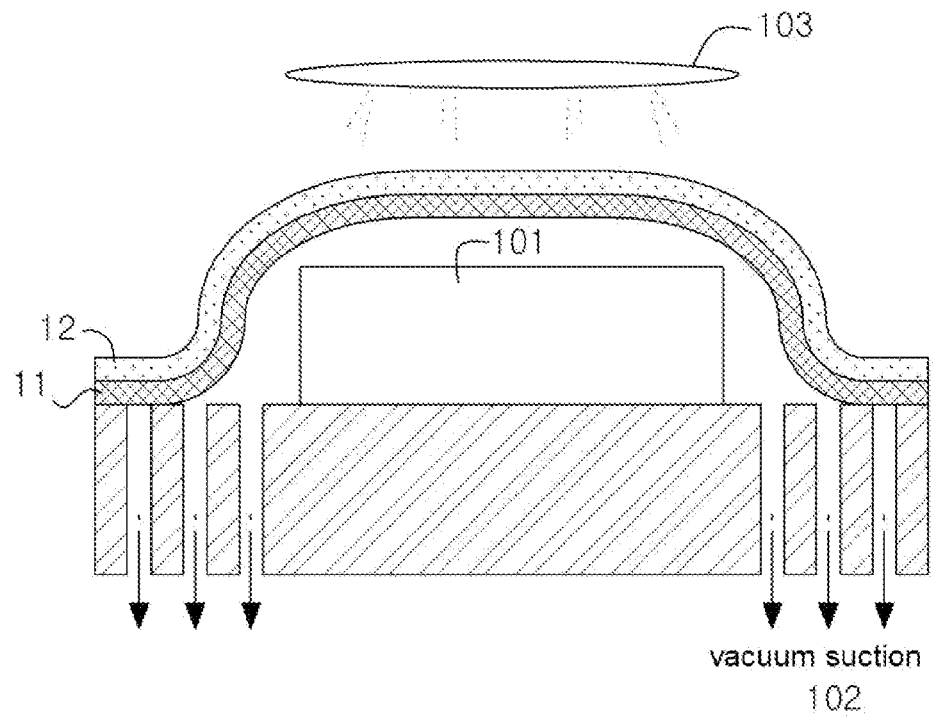

FIG. 10 shows schematically an embodiment of a hard coating forming method that can be usefully applied in case the sheet of the present invention consists of the surface protective sheet. In the above method, the sheet is firstly located on the surface of the formed product (102) so that the substrate (11) side (or the adhesion layer side, which is not shown in the drawing, but if the adhesion layer is formed on the substrate (11)) is lower side. Subsequently, the sheet is heated by a heater (104), etc. to soften the substrate (11), and the sheet is adhered to the formed product (102) by vacuum suction (103) from the lower side. Thereafter, the coating layer can be cured by irradiation of light, thereby forming a hard coating. In the above method, the processes of heating of the sheet and vacuum suction can be performed at the same time, and pressing from the upper side can be performed at the same time with vacuum suction thereby increasing the adhesion efficiency. In this case, the pressing of the sheet can be performed directly by fluid, etc., or with a plastic sheet as a mediator.

The type of the resin and the condition of irradiation of light used in forming the formed product in the above method are not particularly limited, and can be properly selected, for example, within a range shown in the method of FIG. 8.

Figure 11:
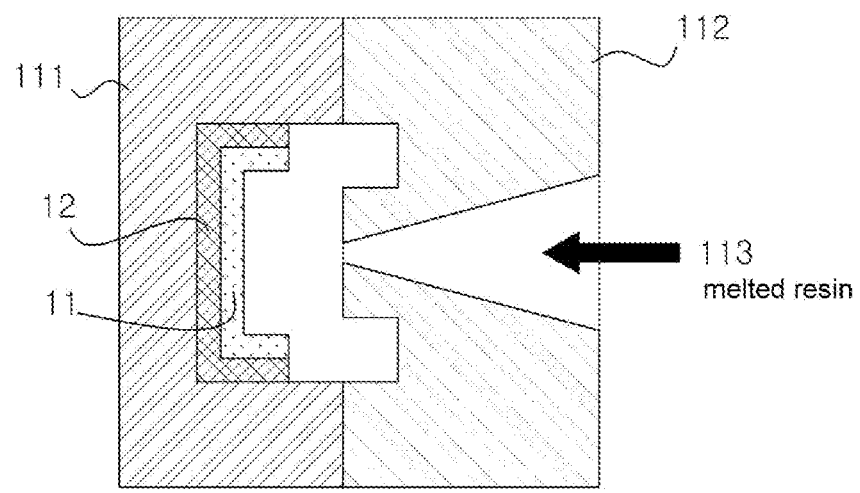

FIG. 11 shows schematically another embodiment of a hard coating forming method in case the sheet is the surface protective sheet, and shows schematically a method of forming a hard coating at the same time with forming by injection molding. In the above method, the sheet is located into an forming mold comprising a movable mold (112) and a fixed mold (111) so that the coating layer (12) faces the fixed mold (111). Subsequently, the mold is closed, and then the melted resin is injected (113) into the mold from the gate formed in the movable mold (112), thereby forming a formed product, and at the same time the adhesion layer formed on the substrate of the sheet or the substrate is adhered on the surface of the formed product. Then, the formed product is cooled as desired, and then the mold is opened and the formed product is removed. And the coating layer can be cured by irradiation of light, etc., thereby forming a hard coating.

The type of the resin and the condition of irradiation of light used in forming the formed product in the above method are not particularly limited, and can be properly selected, for example, within a range shown in the method of FIG. 8.

The hard coating forming method of the present invention can form a hard coating through various ways known to the art, besides the ways described previously.

Effects of the Invention

According to the present invention, a hard coating can be formed to have a high index of refraction and favorable physical properties in terms of hardness, wear-resistance, scratch-resistance, chemical resistance, transparency, gloss, and the like on surface of various formed products including resin formed products and wood products.

MODE FOR CARRYING OUT THE INVENTION

Hereinafter, the present invention will be described in more detail through examples according to the present invention, but it should be understood these examples are not intended to limit the present invention.

EXAMPLES

Example 1

Preparation of a Resin Having Epoxy Group and (Meth)Acryloyl Group 11 parts by weight of glycidyl methacrylate (GMA), 3 parts by weight of methyl methacrylate (MMA), 6 parts by weight of styrene (SM), 150 parts by weight of butyl acetate (BA) and 0.25 parts by weight of 2,2'-azobisisobutyronitrile (AIBN) were added to a reactor equipped with a stirrer, a cooling tube, a dropping lot and a nitrogen leading-in tube. Then, the temperature within the reactor was elevated to about 65° C. over about 1 hour under nitrogen atmosphere, and then was maintained for about 9 hours. Next, a mixture comprising 43 parts by weight of GMA, 12 parts by weight of MMA, 25 parts by weight of SM, 0.5 parts by weight of lauryl mercaptan and 1 parts by weight of AIBN was dropped into the reactor with the dropping lot over about 2 hours under nitrogen atmosphere, and the reactor was maintained at the same temperature for about 3 hours. Thereafter, 0.25 parts by weight of AIBN was added, and the reactor was kept warm at the same temperature for 2 hours. Then, the temperature was adjusted to about 105° C., and the nitrogen leading-in tube was replaced with an air leading-in tube, and then 37 parts by weight of acrylic acid (AA), 0.05 parts by weight of p-methoxyphenol and 0.04 parts by weight of dimethylaminopyridine (DMAP) were added and mixed, and then the mixture was maintained at 105° C. under air bubbling. The mixture was kept warm at the same temperature for 15 hours, 0.05 parts by weight of p-methoxyphenol was added, and the reactor was cooled, and then methylethylketone was added so that non-volatile portion is 30% to prepare a resin having epoxy group and acrylonitrile group. The prepared resin was measured with chemical titration method, and the result was that the epoxy equivalent was 6,600 g/eq, acryloyl equivalent was 349 g/eq, and the conversion weight average molecular weight of standard polystyrene measured with GPC was 60,000.

Preparation of a Coating Solution 5 parts by weight of ethoxylated trimethylolpropane tris(3-mercaptopropionate), 20 parts by weight of dipentaerythritol hexacrylate (DPHA), 5 parts by weight of 1,6-hexaneisocyanate trimer, 8 parts by weight of photo initiator, 1 parts by weight of anti-oxidant, 20 parts by weight of nano silica and 70 parts by weight of methylethylketone were mixed as a thiol based curing agent per 100 parts by weight of the prepared resin to prepare a coating solution.

Preparation of a Sheet for Forming the Hard Coating

A melamine based releasing agent was coated with thickness of 1 μm on one side of polyethylene terephthalate (PET) film having a thickness of 38 μm as a substrate with Gravure coating method to form a release layer. Then, the coating solution prepared on the release layer was applied with thickness of about 6 μm with Micro Gravure coating method. Next, the applied coating solution was heated at 150° C. for 30 seconds, thereby reacting epoxy group of the resin and thiol group of the thiol based curing agent to form a thermoset product. Subsequently, an anchor layer was formed with an acryl based resin, a design layer was formed with an acryl-urethane based resin, a vacuum deposition layer was formed with an acryl based resin deposition primer, and an adhesion layer was formed with an acryl based resin, in serial order on the coating layer comprising the thermoset product, to prepare a sheet for forming a hard coating.

Forming of a Hard Coating

The sheet prepared above was subjected to a method shown in FIG. 9, thereby to form a hard coating on the surface of the formed product. In particular, the sheet was located so that the substrate reached a fixed mold (92), a melted resin was injected, and then the substrate was delaminated and irradiated with UV to form a hard coating. The forming condition was as follows: the temperature of the resin was about 280° C., the temperature of the mold was about 60° C., and the pressure of the resin was about 1,600 kg/cm². Also, the condition of UV irradiation was set as follows: 1,000/cm, lamp height was about 10 cm, and irradiation time was about 3 seconds.

Example 2

A composition and a sheet for forming a hard coating were prepared in the same manner as in Example 1, except that ethyleneglycol bis(3-mercaptopropionate) was used instead of ethoxylated trimethylolpropane tris(3-mercaptopropionate) as the thiol based curing agent. The composition and the sheet were used to form a hard coating on the surface of the formed product.

A physical property (pencil hardness) was evaluated in the following manner for the composition for forming a hard coating prepared above, and the results are shown in Table 1.

1. Pencil Hardness

The composition for forming a hard coating prepared in the examples 1 and 2 and comparative example 1 was coated with a thickness of 6 μm on PMMA (poly(methyl methacrylate) substrate having a thickness of 2 mm using bar coating method. Then, the substrate was thermoset at 160° C. for 40 seconds, and irradiated with UV to cure (1,000 mW). Thereafter, pencil hardness was measured at a load of 1 kg using the pencil hardness tester (manufactured by Coretech) and Mitsubishi pencil for measuring harness.

TABLE 1

|  | Example 1 | Example 2 |
|---|---|---|
| Pencil hardness (H) | 5 | 5 |

As shown in the results of table 1, it can be ascertained that a hard coating having effectively high hardness can be formed by using the composition for forming a hard coating of the present invention.

REFERENCES TO DRAWINGS 1, 2, 3, 4, 5, 6, 7: sheet
11: substrate 12: coating layer
21, 31: adhesion layer 41, 51: design layer
61, 71: deposition layer
81, 101: formed product 82: roll
91, 112: movable mold 92, 111: fixed mold
93, 113: injection direction of melted resin
102: vacuum suction direction 103: heater

What is claimed is:

1. A hard coating forming method comprising:
transcribing a coating layer of a sheet on a formed product, wherein the sheet has a substrate; and the coating layer that is formed on the substrate contains a thermoset product of a resin composition comprising a resin having an epoxy group and a (meth)acryloyl group, and a thiol based curing agent, wherein the resin has epoxy equivalent weights of 4,000 g/eq to 8,000 g/eq, and (meth)acryloyl equivalent weights of 200 g/eq to 500 g/eq;
delaminating the substrate from the sheet; and
irradiating light to the coating layer to cure the coating layer.

2. The hard coating forming method according to claim 1, wherein the sheet further comprises a release layer formed on one side of the substrate, and the coating layer is formed on the release layer.

3. The hard coating forming method according to claim 1, wherein the resin has weight average molecular weights of about 5,000 to 100,000.

4. The hard coating forming method according to claim 1, wherein the thiol based curing agent is represented by the Formula I below:

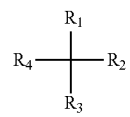

[Formula I]

in the Formula I, R₁ to R₄ represent each independently hydrogen, an alkyl, an alkoxy, an alkenyl, an alkinyl or a thiol-containing group, and more than two of the R₁ to R₄ represent thiol-containing groups.

5. The hard coating forming method according to claim 4, wherein the thiol-containing group is represented by the Formula II below:

-A-B—C-D-SH   [Formula II]

in the Formula II, A is a single bond or an alkylene, B is —NH(C=O)—, —OC(=O)—, —O-E-OC(=O)—, —SC(=O)— or —OCH₂—, C is a single bond or an alkylene, D is a single bond or a divalent residue represented by the Formula III below, and E represents an alkylene:

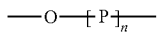

[Formula III]

in the Formula III, P represents divalent aryl, and n represents an integer of 0 to 10.

6. The hard coating forming method according to claim 4, wherein the R1 to R4 represent each independently hydrogen, an alkyl having carbon atoms of 1 to 4, or -A-B—C-D-SH, and more than two of $R_1$ to $R_4$ are -A-B—C-D-SH, wherein A is a single bond or an alkylene having carbon atoms of 1 to 4, B is —OC(=O)— or —O-E-OC(=O)—, C is a single bond or an alkylene having carbon atoms of 1 to 4, D is a single bond or a divalent residue represented by the Formula IV below, and E is an alkylene having carbon atoms of 1 to 4:

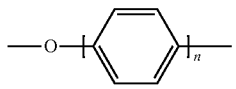

[Formula IV]

in the Formula IV, n represents an integer of 0 to 10.

7. The hard coating forming method according to claim 1, wherein the resin composition comprises the thiol based curing agent in 0.1 to 10 parts by weight per 100 parts by weight of the resin.

8. The hard coating forming method according to claim 1, wherein the resin composition further comprises more than one component selected from the group consisting of a photo initiator, a multifunctional acrylate, an anti-oxidant, a lubricant, a UV absorber, a thermosetting catalyst, a filler and an isocyanate compound.

9. The hard coating forming method according to claim 1, wherein the sheet further comprises an adhesion layer formed on the coating layer.

10. The hard coating forming method according to claim 1, wherein the sheet further comprises a design layer formed on the coating layer.

11. The hard coating forming method according to claim 1, wherein the sheet further comprises a deposition layer formed on the coating layer.

12. The hard coating forming method according to claim 1, comprising adhering the coating layer of the sheet on a surface of a formed product; delaminating the substrate; and curing the coating layer by irradiating light.

13. The hard coating forming method according to claim 1, comprising locating the sheet into an injection mold so that the coating layer of the sheet can be contacted with the formed product; injecting a melted resin into a cavity within the injection mold; delaminating the substrate from the sheet; and curing the coating layer by irradiating light.

14. The hard coating forming method according to claim 1, comprising locating the sheet so that the substrate side faces the surface of the formed product; heating the sheet to soften the substrate; subjecting the sheet to vacuum suction from the lower part to adhere on the surface of the formed product; and curing the coating layer by irradiating light.

15. The hard coating forming method according to claim 1, comprising locating the sheet into an injection mold so that the substrate of the sheet can be contacted with the formed product; injecting a melted resin into the cavity within the injection mold; and curing the coating layer by irradiating light.

16. The hard coating forming method according to claim 1, wherein the formed product is a resin product formed from a composition comprising a polystyrene based resin, a polyolefin based resin, an acrylonitrile butadiene styrene (ABS) resin, an acrylonitrile styrene (AS) resin, an acrylonitrile (AN) resin, a polyphenylene/polystyrene based resin, a polycarbonate based resin, a polyacetal based resin, an acryl based resin, a polycarbonate denatured polyphenylene ether resin, a polyethylene terephthalate resin, a polybutylene terephthalate resin, an ultra-high molecular weight polyethylene resin, a polysulfone resin, a polyphenylene sulfide based resin, a polyphenylene oxide based resin, a polyacrylate based resin, a polyetherimide resin, a polyimide resin, a liquid crystal polyester resin or a polyaryl based heat-resistant resin.

17. The hard coating forming method according to claim 1, wherein irradiation of light is performed under the condition of illuminance of 80 mW/cm$^2$ to 200 mW/cm$^2$ and irradiance of 1,000 mJ/cm$^2$ to 2,000 mJ/cm$^2$ for 1 second to 5 minutes by using UV having a wavelength of about 300 nm to 400 nm.

* * * * *